Jan. 17, 1939.  A. R. KENNEDY  2,144,334
APPARATUS FOR PROCESSING CANNED FOODS
Filed Aug. 17, 1936  2 Sheets-Sheet 1
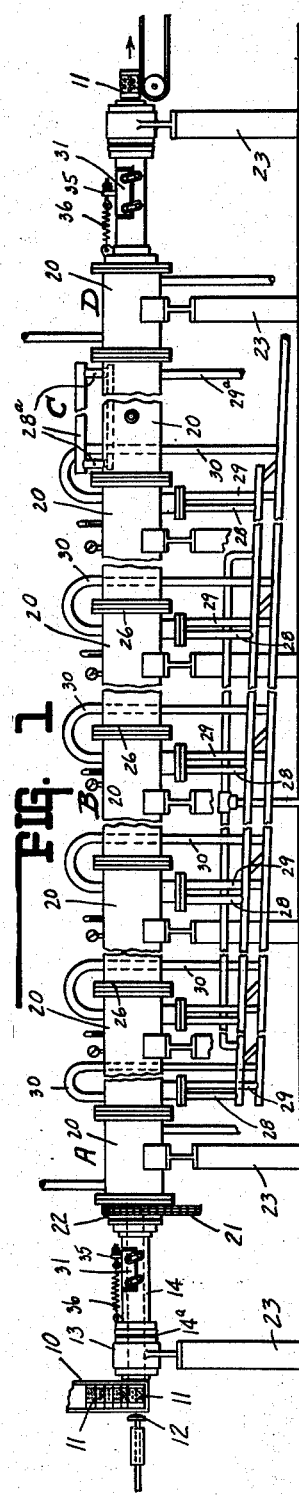
INVENTOR.
ALEX R. KENNEDY.
BY
Lockwood, Goldsmith & Galt
ATTORNEYS.

Jan. 17, 1939.　　　A. R. KENNEDY　　　2,144,334
APPARATUS FOR PROCESSING CANNED FOODS
Filed Aug. 17, 1936　　　2 Sheets-Sheet 2
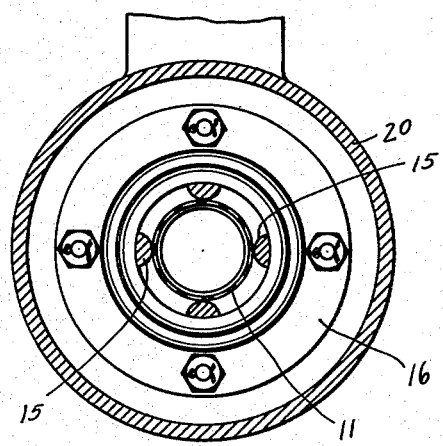
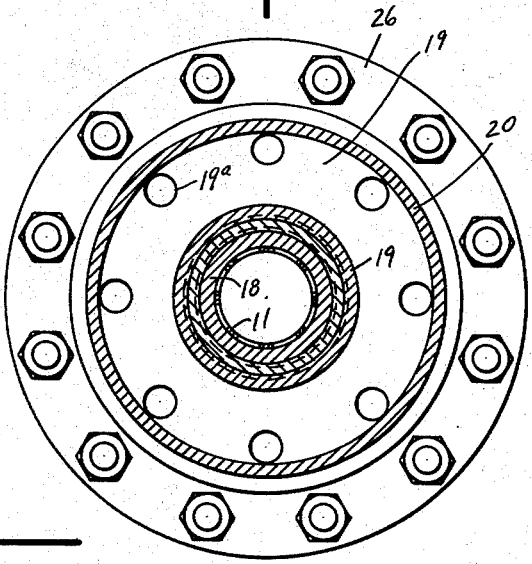
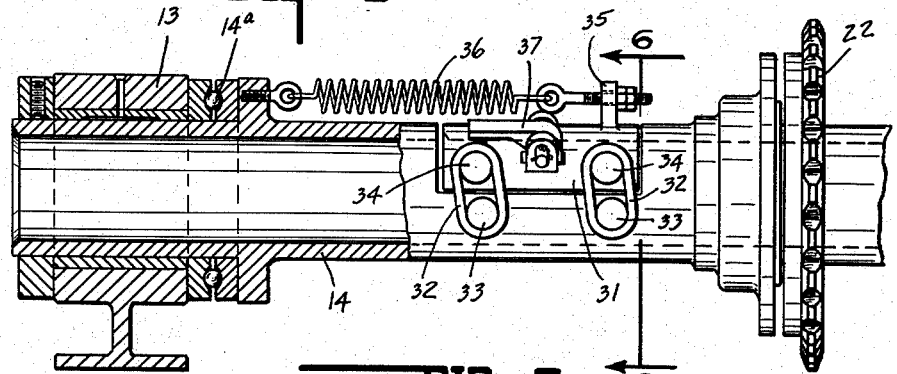
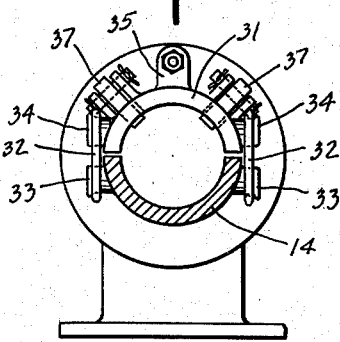
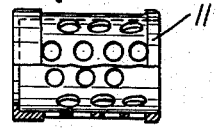
INVENTOR.
ALEX R. KENNEDY.
BY
Lockwood, Goldsmith & Galt
ATTORNEYS.

Patented Jan. 17, 1939

2,144,334

UNITED STATES PATENT OFFICE 2,144,334

APPARATUS FOR PROCESSING CANNED FOODS

Alex R. Kennedy, Indianapolis, Ind., assignor to Indiana Condensed Milk Company, Indianapolis, Ind., a corporation Application August 17, 1936, Serial No. 96,428

8 Claims. (Cl. 126—272)

This invention relates to an apparatus for processing products such as foods and beverages ordinarily preserved in tin cans or similar containers, and wherein the processing resides in the application of heat and its removal. This application is a continuation in part of applicant's issued Patent No. 2,056,526, granted October 6, 1936, for "Method of processing canned products".

It is the principal object of this invention to provide an apparatus for producing canned goods of finer quality and taste than heretofore has been possible by known apparatus. Furthermore, it is the object herein to effect the processing by means of this apparatus with a saving of time and heat over that heretofore required.

Wherein the apparatus as hereinafter more specifically described is applied to the processing of evaporated milk, one of the important advantages herein lies in the elimination of the usual caramelized or burned flavor heretofore common and recognized as incident thereto. Thus, evaporated milk processed by means of this apparatus, when diluted with water, results in a product comparing favorably with pasteurized milk used for drinking. Likewise, undiluted it may be used with cereal and fruits in the place of fresh cream with practically no different flavor or taste, because of the absence of the usual burnt or caramelized flavor. In short, it may be used in the place of fresh or pasteurized milk or cream for coffee, baby formulas, cooking and the like without destroying the proper food flavor, because of the absence of the usual evaporated milk taste. The same follows in respect to its color, wherein the darkish or burnt color common to the usual evaporated milk is absent, the evaporated milk processed in accordance herewith being more nearly that of unsterilized milk which has been concentrated to double richness. Milk produced by this process is suitable for the manufacture of ice cream because of its light color, uncaramelized flavor and viscous body. The viscosity of milk produced by this apparatus is greater than that of the usual evaporated milk, and will remain so over a longer period of storage, at undesirable temperatures. Milk produced by this apparatus will whip equally as well as whipping cream and better than ordinary evaporated milk.

Another advantage of this apparatus resides in the fact that when tin cans are used they are not de-tinned, either at the time of processing or after prolonged aging, as are the cans in which the usual evaporated milk is processed. The tin plate in the inside of the cans remains as clean and bright after several months storage as when new, as distinguished from their being de-tinned during and after sterilization as with present methods. Likewise, the cans are practically free from scorched milk which usually is found on the inside of cans processed as heretofore.

This is accomplished by causing the canned product to pass, while being rapidly agitated, through two or more heating and cooling compartments, wherein critical temperatures and pressures may be maintained and sudden change in temperature of the product may be effected while said product receives maximum agitation. Thus, the invention broadly may be considered to reside in rapidly and continuously rotating the containers of the product at such speed as will obtain maximum agitation thereof while continuously passing the containers of the product through a heating compartment maintained at a critical temperature and pressure, such as to heat the product during its agitation to the maximum degree without burning or scorching. Thus, it is desirable to bring the product to the maximum processing temperature for a minimum length of time to effect sterilization.

The speed of rotation to effect maximum agitation may depend upon the size of the container, the viscosity of the product and its temperature. Too rapid rotation of the container will cause the product to rotate therewith so as to decrease the agitation, while insufficient speed of rotation will permit of scorching at the higher temperature. Thus, it is the purpose herein to produce an apparatus which will permit the use of the highest possible temperature for effecting sterilization and protect the product from deleterious results thereof.

By reason of the high rate of speed permissible and the resultant rapid heat transfer and by reason of the relatively higher temperatures used on each individual product, it is possible to complete the processing in a much shorter time than heretofore. The invention may, therefore, be characterized as an apparatus employing high temperature, short time and high speed, resulting in retaining the original flavor, color and aroma of the product.

It is common knowledge that in the processing of evaporated milk, high temperatures for prolonged periods of time cause changes in the color, flavor and viscosity of the product. The first two factors mentioned are undesirable changes while the latter one, or the development of viscosity, is essential to the manufacture of a superior product. The changes of flavor and color are due to chemical changes in the protein and to caramelization of the lactose. These changes are effected by increased temperatures and by increased duration of exposure at like temperatures, but of the two, the time of exposure has considerably more effect upon the degree of caramelization.

It is also common knowledge that in the processing of evaporated milk, high temperatures for prolonged periods cause thickening of the product and ultimately a separation of the curd or coagulation. One theory is that this thickening is due to the hydration of the casein molecule upon the release of calcium into the serum. This hydration causes swelling of the casein molecule which in turn causes thickening of the product by increasing the percentage volume of the suspended phase. This thickening is increased by increased temperatures and by increased periods of exposure at like temperatures. However, the speed of this reaction is more sensitive to increased temperatures than to increased time of exposure to like temperatures.

It is, therefore, logical that by increasing the temperature and shortening the time of exposure a point can be reached at which maximum viscosity can be obtained with minimum caramelization. The maximum viscosity referred to is that viscosity reached at a temperature, for a given period of exposure, a fraction of a degree Fahrenheit below that temperature at which coagulation occurs. This minutely accurate temperature control is absolutely essential because of the speed of the hydration and thickening at the high temperatures used. By this invention, I have made possible the accurate control of temperature necessary to the development of maximum viscosity without coagulation. As an incident to the above process, complete sterilization of the product takes place.

By the use of considerably higher temperatures in the processing of evaporated milk, the speed of the reaction causing thickening of the milk is increased. However, the use of the higher temperatures does not increase the speed of the reactions which cause color and flavor changes proportionately. Hence, by the use of higher temperatures and shorter times of exposure one is able to obtain greater viscosities with less caramelization. Also, because of the fact that the speed of caramelization is not increased proportionately as much as the speed of hydration or thickening by higher temperatures and shorter periods of exposure, one is able to reach the maximum viscosity of each particular milk, whereas with the usual low temperature-long time process, the limiting factor is caramelization in some cases.

Other objects and features of the invention will be understood from the accompanying drawings and the following description and claims:

Fig. 1 is a side elevation of the apparatus with parts broken away. Fig. 2 is an enlarged central vertical section through one of the couplings and bearing supports. Fig. 3 is a section taken on the line 3—3 of Fig. 2. Fig. 4 is the same as Fig. 3 viewed through one of the coupling and bearing supports perforated for permitting communication between sections of one compartment. Fig. 5 is a side elevational view of the braking mechanism with parts shown in section. Fig. 6 is a section taken on the line 6—6 of Fig. 5.

Fig. 7 is a side elevation of one of the cages with part in section.

The apparatus as herein illustrated, as constituting one type of structure used is more particularly applicable to the processing of evaporated milk, various modifications coming within the scope of the invention being applicable to other and various canned foods, preferably of the liquid and semi-liquid type.

Associated with the apparatus there is diagrammatically illustrated the usual conveyor chute 10 down which a series of containers or cages 11 pass by gravity. Each of said containers encloses a can of the product to be processed, such as evaporated milk. Said containers are herein shown as tubular in shape, having a perforated peripheral wall but an imperforate bottom or end wall. The other end is provided with an imperforate cap. It is the purpose of said container merely to protect the can while transmitting thereto rapid rotation and change in temperature. It is in many instances feasible to do away with the perforated container 11 and simply utilize the can as the container for the product.

The chute carries the containers into alignment with the intake end of the apparatus into which they are individually pushed by a plunger 12 which is caused to reciprocate at a predetermined rate by any suitable mechanism not shown herein. The intake end 13 of the apparatus is caused to rotate with the feed-in tube 14, between which there is provided end thrust bearings 14a. Extending through the entire length of the apparatus and all the compartments thereof, including the feed-in tube, there is a rotating longitudinal carrier 15 formed of four spaced rods.

The rods comprise the carrier and it is formed in a plurality of sections connected together by suitable bearings, as illustrated in Fig. 2. The opposite ends of the rods are supported by flanged collars 16 in spaced relation, said collars being secured to corresponding flanges 17 mounted at opposite ends to a sleeve 18, said sleeve being rotatably supported by the bearing 19 which in turn is mounted in a tubular housing 20. The sleeve 18 is of an inside diameter corresponding to that of the rods 15 so that the containers 11, upon sliding endwise between said rods, may freely pass through the sleeve 18 with as close a fit as practical.

From the foregoing, it will be noted that the containers 11 are slidably pushed through the carrier 15 from the intake end of the apparatus to the discharge end, said carrier being supported at intervals by the sleeves 18 rotating in the bearings 19, the containers slidably passing through said sleeves.

The carrier 15 is rapidly rotated at approximately 200 R. P. M. by a drive chain 21 driving a sprocket 22 at the intake end of the apparatus. The apparatus is supported at intervals upon legs 23. The discharge end of the carrier 15 permits the cans to be discharged onto a conveyor, after having been duly processed.

The tubular housing 20 is divided into a plurality of processing compartments indicated at A–D, inclusive. The longer compartment B is divided into a plurality of sections. At the ends of each section the casing is provided with flanges 26 between which the bearing support 19 is secured. The bearing support is provided with the usual channel 27 for conveying lubricant to the bearing surface of the sleeve 18. Said compartments are separated by the bearing support 19 which acts as a stuffing box and is provided with the usual seals and end thrust washers to prevent leakage of water or steam therethrough, as illustrated in Fig. 2. However, in compartment B, comprising a plurality of sections, the bearing castings employed intermediate the sections within the compartments are perforated at 19a to permit free passage of steam, as illustrated in Fig. 4.

The temperature of each compartment is controlled by means of steam or water, said compartments being provided with the usual instruments comprising a thermometer and pressure gauge for indicating the exact temperature at a given pressure within the casing of the compartment. For heating the interior of the casing within each compartment, there is provided a plurality of feed pipes having suitable control valves. Thus, a pipe 28 introduces steam into the housing 20 of compartment B, the condensate being discharged through pipe 29 and the steam pressure equalized through pipe 30 at a predetermined maximum temperature and steam pressure. Compartment C is maintained at the prescribed temperature by a water spray discharged therein from the water intake pipe 28a and discharged through the pipe 29a. Compartments A and D, at each end of the apparatus are both open to atmospheric pressure.

In order that the containers may be maintained in close contact with each other end to end under pressure and pass through the carrier at a predetermined speed, there is provided a brake shoe at each end of the apparatus, as illustrated in Fig. 5. Each brake shoe consists of a peripheral section of the intake tube 14. It is of the same contour as the tube, but of slightly less sectional diameter, and is hinged in position thereon by the links 32 pivotally connected to the pin 33 on the tube and the pin 34 on the shoe. The shoe carries a lug 35 to which is connected a tension spring 36, the other end of said spring being connected to a rigid flange upon the tube. By means of this arrangement, each container passes through the tube and comes in contact with the shoe. When the shoe is in normal position, under tension of the spring 36, it frictionally resists passage of the container. However, upon force being applied to the container when frictionally engaged by the shoe, it will permit passage thereof in one direction upon the shoe being moved forwardly about the pivotal mounting of the links 32 and against the tension of the spring 36. Because of the resistance to the passage of containers at the discharge end of the apparatus, they will press firmly against each other and their passage therethrough will be maintained at a constant speed. Furthermore, the brake shoe at the discharge end prevents the containers from being too rapidly discharged under pressure.

In order that the pressure exerted by the containers against each other within the apparatus be prevented from forcing a container backwards from the intake end when the plunger 12 is retracted, the shoe 31 at the intake end is provided with a pair of pivoted latches 37 which extend slightly beyond the inner suface of the shoe to permit passage of a container in one direction only and prevent passage in the reverse direction, as illustrated in Fig. 6.

In operation, the containers are pushed through the casing at a predetermined speed end to end, each controlled by the rate of reciprocation of the plunger 12. The containers are pushed so as to slide through the carrier 15 which is being rotated by the chain 21 at a high speed, preferably about 200 R. P. M. As the containers thus move through the respective compartments while rotating, they are subjected to a predetermined temperature maintained in at least two of said compartments by a heat transfer medium, such as steam and water.

As the containers move through the sleeves 18, they completely fill them and prevent any substantial passage of water or steam therethrough so that while each compartment is shut off and separated from each adjacent compartment, the containers continuously move from one compartment to the other while their rotation is maintained through the medium of said rotating sleeve.

In respect to the method of processing accomplished by the above-described apparatus, it will be noted that by means of rapid rotation of the containers or cans, resulting in maximum agitation of the contents thereof, the heat transfer effected through the conductivity of the metal walls of the cans will be greatly facilitated so that heat is rapidly transferred to or withdrawn from the contents of the cans. The speed of rotation may be readily controlled so that the rate of heat conductivity to the contents may be varied, depending upon the requirements.

The period of time during which each can is subjected to the temperature of the respective compartments is controlled both by the length of the compartment and the speed of travel of the cans therethrough as required by the character of the product. Thus, this factor is dependent roughly upon the length of the compartment and more accurately upon the speed at which the plunger 12 is operated.

The temperature of each compartment may be controlled independently of the other compartments by the usual medium of valves in the delivery pipes which are manipulated in accordance with observations taken from the thermometers and pressure instruments, all as indicated in Fig. 1. For example, in the processing of evaporated milk, good results may be obtained by feeding the containers 11 through the rotating carrier at a predetermined speed, and having each compartment of such length that between the length of each compartment and a fixed speed of travel the cans will be subjected to a cooling temperature in compartment B of approximately 245°–280° F., immediately passing therefrom into compartment C where rapid cooling takes place at a temperature of approximately 75° F., and before entering the apparatus the cans containing the product are preheated at atmospheric pressure and introduced into the atmospheric pressure compartment A before passing into the cooking compartment B. Upon entering the cooling compartment C, sufficient heat is removed from the contents of the can to reduce the pressure below the point where can distortion occurs, said compartment being maintained under sufficient air pressure to protect the cans against distortion in this compartment. After leaving compartment C, they pass into an atmospheric pressure compartment D and thence from the apparatus to any suitable device for further cooling preparatory to being labeled and packed.

These sudden and substantial changes in temperature are made possible by the separated compartments coupled with the rapid rotating and definite predetermined periods during which the cans are subjected to such temperatures. In this manner the milk may be subjected to a critical temperature for a period of time sufficient to thicken the evaporated milk but with a sudden change of temperature just before the milk coagulates. Thus, the advantages of the apparatus may be said to lie in the ability to rapidly change temperature of the product at the proper time. This results in obtaining the desired effect including sterilization and thickening without curdling, scorching or de-tinning the cans.

Whereas the invention has been described particularly as applying to evaporated milk, any other products, such as canned foods and beverages, may be processed by the same apparatus, and wherein reference is made to canned products, such term includes bottled goods or the use of any other similar containers for a sealed product.

The invention claimed is:

1. An apparatus for processing canned products including a housing divided into a plurality of compartments, means for conveying the containers of the products continuously through said compartments so as to pass therethrough in a predetermined length of time, means for rapidly rotating said conveying means so as to impart to the products maximum agitation during their passage through said compartments, and means for maintaining the individual compartments at different prescribed temperatures.

2. An apparatus for processing canned products including an elongated housing divided into a plurality of compartments, a carrier rotatably mounted in said housing and extending through the several compartments thereof, means for rapidly rotating said carrier, means for feeding the containers of the products end to end through said carrier to be rapidly rotated therewith, and means for maintaining the individual compartments at different prescribed temperatures.

3. An apparatus for processing canned products including an elongated housing divided into a plurality of compartments, a carrier rotatably mounted in said housing, bearings supported in said housing intermediate said compartments for rotatably supporting said carrier, means for rapidly rotating said carrier, means for feeding containers of the products end to end through said carrier and bearings to be rapidly rotated with said carrier, and means for maintaining the individual compartments at different temperatures.

4. An apparatus for processing canned products including an elongated housing divided into a plurality of separate compartments, a bearing included in said housing intermediate said compartments for separating them, a sleeve rotatably mounted in said bearing, said sleeve being substantially of the diameter of the containers of the products passing therethrough, whereby said containers will act as a closure to prevent heat transfer from one compartment to the other through said sleeve, a carrier extending in alignment with said sleeve and carried thereby, means for rapidly rotating said carrier and sleeve as a unit, means for feeding the containers end to end through said carrier and sleeve to be rapidly rotated therewith, and means for maintaining the individual compartments at different temperatures.

5. An apparatus for processing canned products including an elongated housing divided into a plurality of sections forming compartments, a bearing secured to said housing intermediate said sections for securing them together in alignment and separating them one from the other, a cylindrical sleeve rotatably mounted in said bearing, carriers having their ends secured to said sleeve and extending in alignment therewith for embracing the containers of the products carried thereby, means for rapidly rotating said carriers and sleeve, means for feeding the containers end to end through said carriers and sleeve to be rapidly rotated therewith, and means for maintaining the individual compartments at different temperatures, the containers acting in conjunction with the sleeve and bearing for preventing heat transfer from one compartment to the other.

6. An apparatus for processing canned products including an elongated housing divided into a plurality of compartments, a carrier rotatably mounted in said housing and extending through the several compartments thereof, means for rapidly rotating said carrier, means for feeding the containers of the products end to end through said carrier to be rapidly rotated therewith, means for maintaining the individual compartments at different temperatures, and means at the discharge end of the housing for retarding the discharge of the containers, whereby they will be maintained with their ends abutting during their passage through the carrier.

7. An apparatus for processing canned products including an elongated housing divided into a plurality of compartments, bearings mounted intermediate said compartments for separating one compartment from another, a rotating sleeve mounted in each of said bearings, carriers carried by said sleeves and in alignment therewith, means for rapidly rotating said carriers and sleeves, means for feeding the containers of the products end to end through said carriers and sleeves to be rapidly rotated therewith, said sleeves being substantially of the diameter of said containers for permitting passage therethrough while said containers act as a closure therefor, means for maintaining the individual compartments at different temperatures, and means at the dischrge end of said housing for retarding the passage of the containers so as to maintain their ends in abutting relation.

8. An apparatus for processing canned products including an elongated housing having a plurality of compartments of varying and predetermined lengths, a carrier mounted in said housing extending through the several compartments and spaced from the housing, means for feeding the containers of the products through said carrier with their ends abutting, means for separating the several compartments, said means being provided with openings through which the carrier passes, said containers acting as a closure for said openings in said separating means during their passage through said openings, and means for maintaining the individual compartments at different temperatures.

ALEX R. KENNEDY.